INFORMATION REPRODUCING SYSTEM

Filed Aug. 6, 1958 8 Sheets-Sheet 1

INVENTORS
ARTHUR J. GEHRING, JR.
LLOYD W. STOWE
BY LAWRENCE F. HARRISON

[signature]
ATTORNEY

INFORMATION REPRODUCING SYSTEM

Filed Aug. 6, 1958 8 Sheets-Sheet 2

INVENTORS
ARTHUR J. GEHRING, JR.
LLOYD W. STOWE
LAWRENCE F. HARRISON
BY [signature]
ATTORNEY

INVENTORS
ARTHUR J. GEHRING, JR.
LLOYD W. STOWE
LAWRENCE F. HARRISON
BY
ATTORNEY

INVENTORS
ARTHUR J. GEHRING, JR.
LLOYD W. STOWE
LAWRENCE F. HARRISON
BY
ATTORNEY

INVENTORS
ARTHUR J. GEHRING, JR.
LLOYD W. STOWE
BY LAWRENCE F. HARRISON
Fred Fisher
ATTORNEY.

Dec. 8, 1959 A. J. GEHRING, JR., ET AL 2,915,967

INFORMATION REPRODUCING SYSTEM

Filed Aug. 6, 1958 8 Sheets-Sheet 6

INVENTORS
ARTHUR J. GEHRING, JR.
LLOYD W. STOWE
BY LAWRENCE F. HARRISON

ATTORNEY

INFORMATION REPRODUCING SYSTEM

Filed Aug. 6, 1958 8 Sheets-Sheet 7

INVENTORS
ARTHUR J. GEHRING, JR.
LLOYD W. STOWE
BY LAWRENCE F. HARRISON
ATTORNEY

Dec. 8, 1959 A. J. GEHRING, JR., ET AL 2,915,967

INFORMATION REPRODUCING SYSTEM

Filed Aug. 6, 1958 8 Sheets-Sheet 8

INVENTORS
ARTHUR J. GEHRING, JR.
LLOYD W. STOWE
BY LAWRENCE F. HARRISON

ATTORNEY

United States Patent Office 2,915,967

Patented Dec. 8, 1959

2,915,967

INFORMATION REPRODUCING SYSTEM

Arthur J. Gehring, Jr., Haddonfield, N.J., and Lawrence F. Harrison, Philadelphia, and Lloyd W. Stowe, Broomall, Pa., assignors to Sperry Rand Corporation, New York, N.Y., a corporation of Delaware Application August 6, 1958, Serial No. 753,512

18 Claims. (Cl. 101—93)

Figure 1:
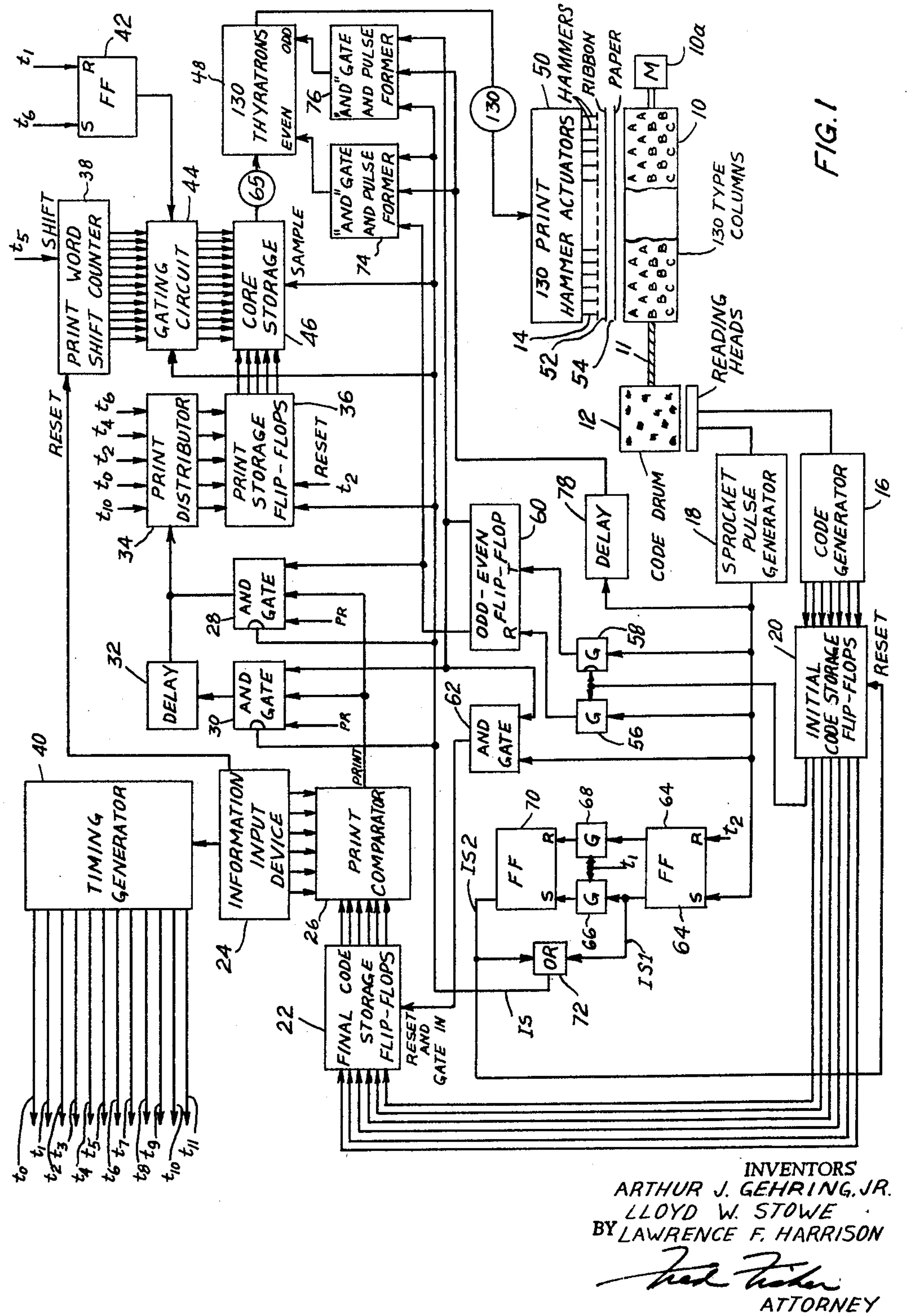

This invention relates to information reproducing systems and, in particular, to high speed printers that are controllable by data processing machines which may utilize drum memories.

The state of the data handling or computer art is advanced to a degree wherein information is processed at extremely high speeds. It becomes desirable, therefore, to provide high speed machines with output devices, such as printers, which are capable of handling the rapid supply of information.

It is, therefore, an object of this invention to provide a novel information reproducing system.

Another object of this invention is to provide a novel printer which operates to produce legible type without undue limitation upon the speed of operation.

A further object of this invention is to provide an efficient and novel printer which utilizes fewer components than those of the prior art.

A feature of the present invention is that the printer herein described can decode and print out information which appears in dynamic form such as the information stored in recirculating or drum type memories.

In accordance with this invention, a rotatable type wheel has a plurality of staggered type columns wherein each of the type columns is provided with a plurality of alpha-numeric character type elements. The typewheel used in a preferred embodiment of the invention is described in an article by Earl Masterson and Abraham Pressman, entitled "A Self-Checking High-Speed Printer," Special Publication T–70, Proceedings of the Eastern Joint Computer Conference, December 1954. The typewheel described provides a standard line of 130 columns wide, with 51 different characters available in each column. The preferred typewheel carries lateral rows of alternate columns, wherein, for example, one row contains A's at the 1, 3, 5, . . . 129 columns (herein termed an "odd" row); the next row contains A's at the 2, 4, 6, . . . 130 columns (herein termed an "even" row); the next row contains "odd" B's; the following row contains "even" B's; and so on.

As each row of type elements approaches under a line of printing hammers, a sprocket pulse generator provides an output pulse. As a row of type elements representing similar alpha-numeric symbols approaches the printing hammers, a code generator provides an electrical representation of the next different character to appear under these hammers. In the preferred embodiment, the sprocket pulse occurs for each row; i.e. 102 times per revolution of the typewheel; whereas a new code is generated once per different character, i.e. 51 times per revolution of the typewheel.

Means are provided, responsive to the sprocket pulse, to cause the printing of like characters in one row of the typewheel, thus causing the printing of alternate columns corresponding to the immediately preceding generated code, such as all the even A's. This sprocket pulse further causes information to be stored relating to characters to be printed by the following row, such as odd B's. Thereafter, the following sprocket pulse causes a print-out of all the odd B's and further causes information to be stored concerning the even B's to be printed out at the time of the next sprocket pulse. The inventive concept of the system described applies to alternate forms of typewheels and related circuitry. For example, the typewheel may provide three rows of similar characters, wherein three sprocket pulses are generated for every different character; other than 51 different characters may be provided; "even" rows may precede "odd" rows; etc.

A line of information to be printed is preferably provided by an information input device in dynamic form, such as the information stored in recirculating or drum type memories. The line of information to be printed occurs as 130 coded representations of characters. The 130 characters may be considered as 13 words of 10 characters each. The entire line of information to be printed is compared for identity, one character at a time, with the instantaneous code generated by the code generator. This comparison takes place several times before the code generator changes its code to indicate the next character to be printed out. Means are provided for initially storing the alternate (odd, for example) comparisons of the characters for one word. A word counter, which shifts once every word time in the information source, transfers the stored half-word comparison into a storage unit of 65 stages. The 65-stage storage unit stores all the alternate comparisons ("odd") for one line of 130 characters. Printing hammers corresponding to the stored comparisons are subsequently actuated. The input signal representing the 130 characters to be typed out is compared once more with the same instantaneous code generated by the generator so that the 65-stage storage unit stores the remaining alternate ("even") comparisons. Printing hammers ("even") for these comparisons are then subsequently actuated. The input signal is then compared with a character code for the following row of type, and so forth, until the entire line is printed, whereupon a new input signal is provided by the information input device representative of the next line of information to be printed, and the print paper may be advanced one or more lines.

Figure 2A:
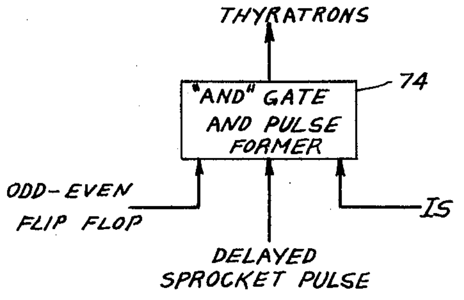
Figure 2B:
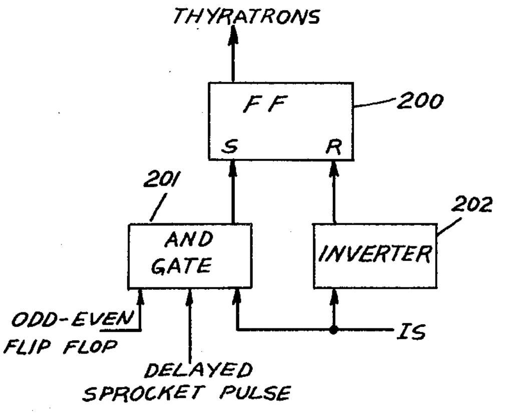
Figure 3A:
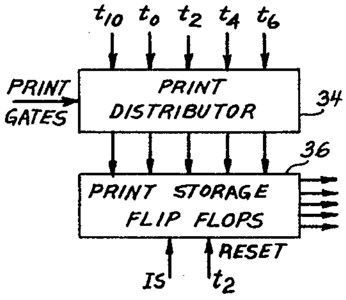
Figure 3B:
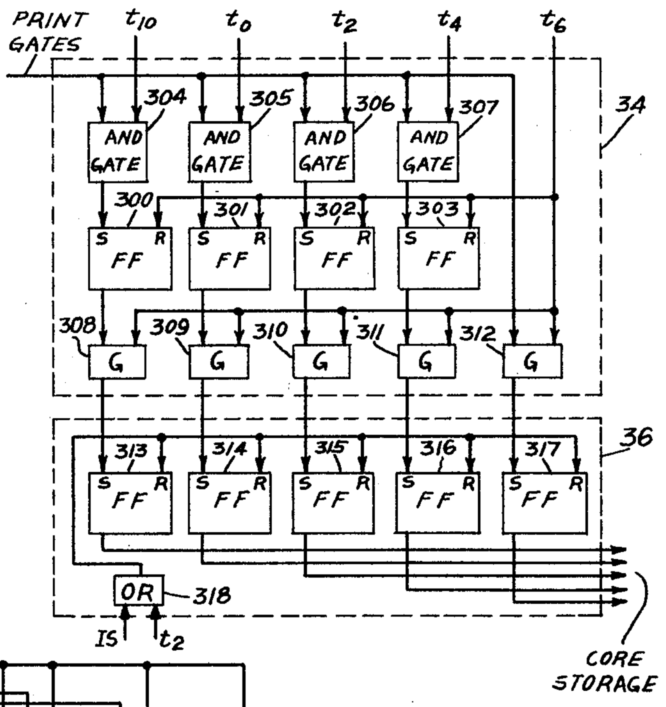
Figure 4A:
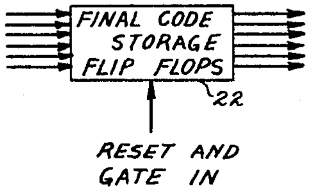
Figure 4B:
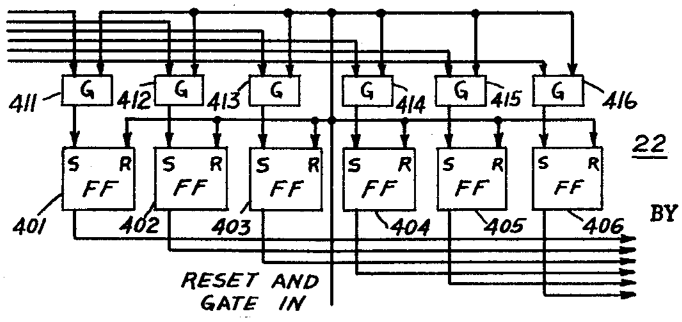
Figure 5A:
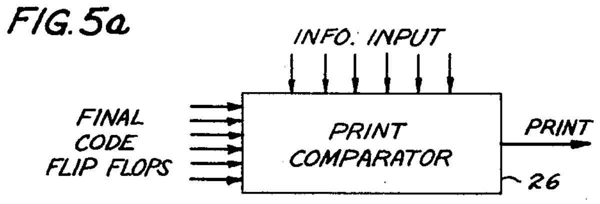
Figure 5B:
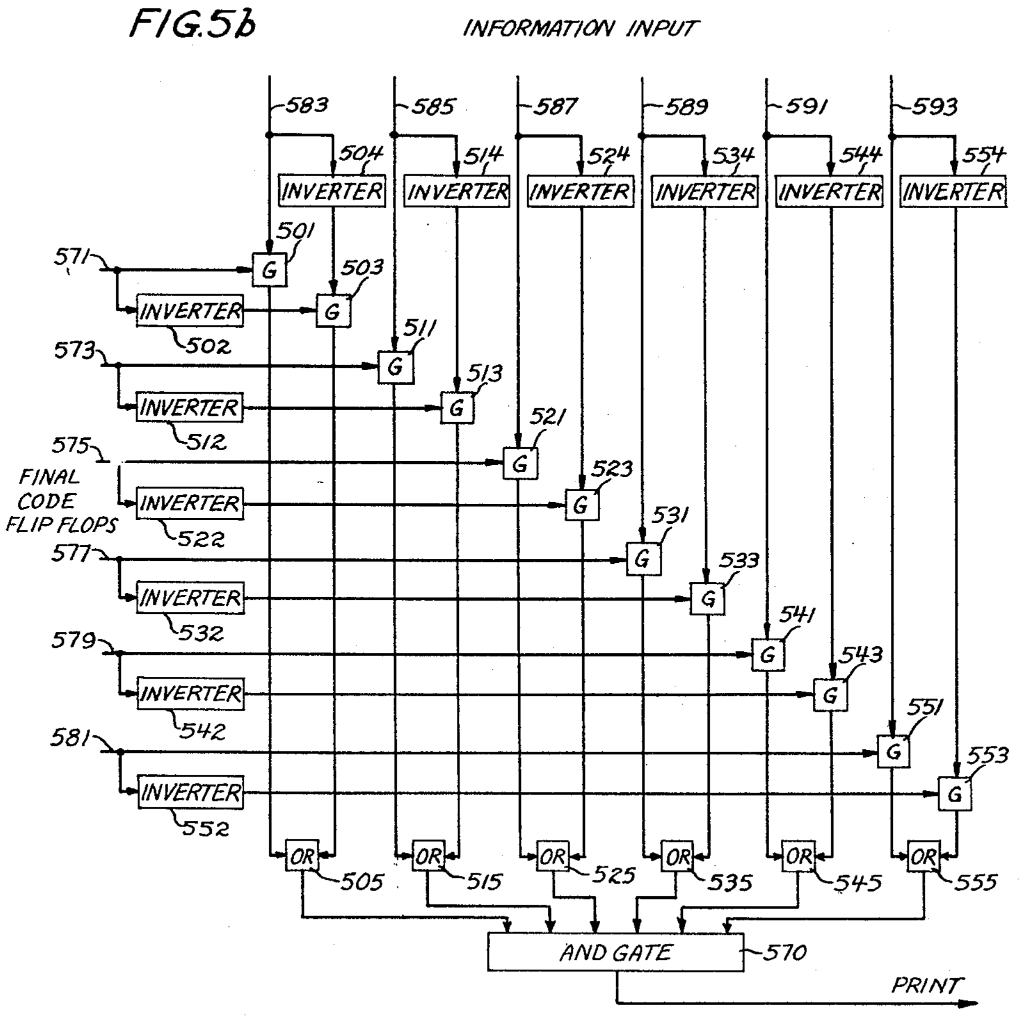
Figure 6A:
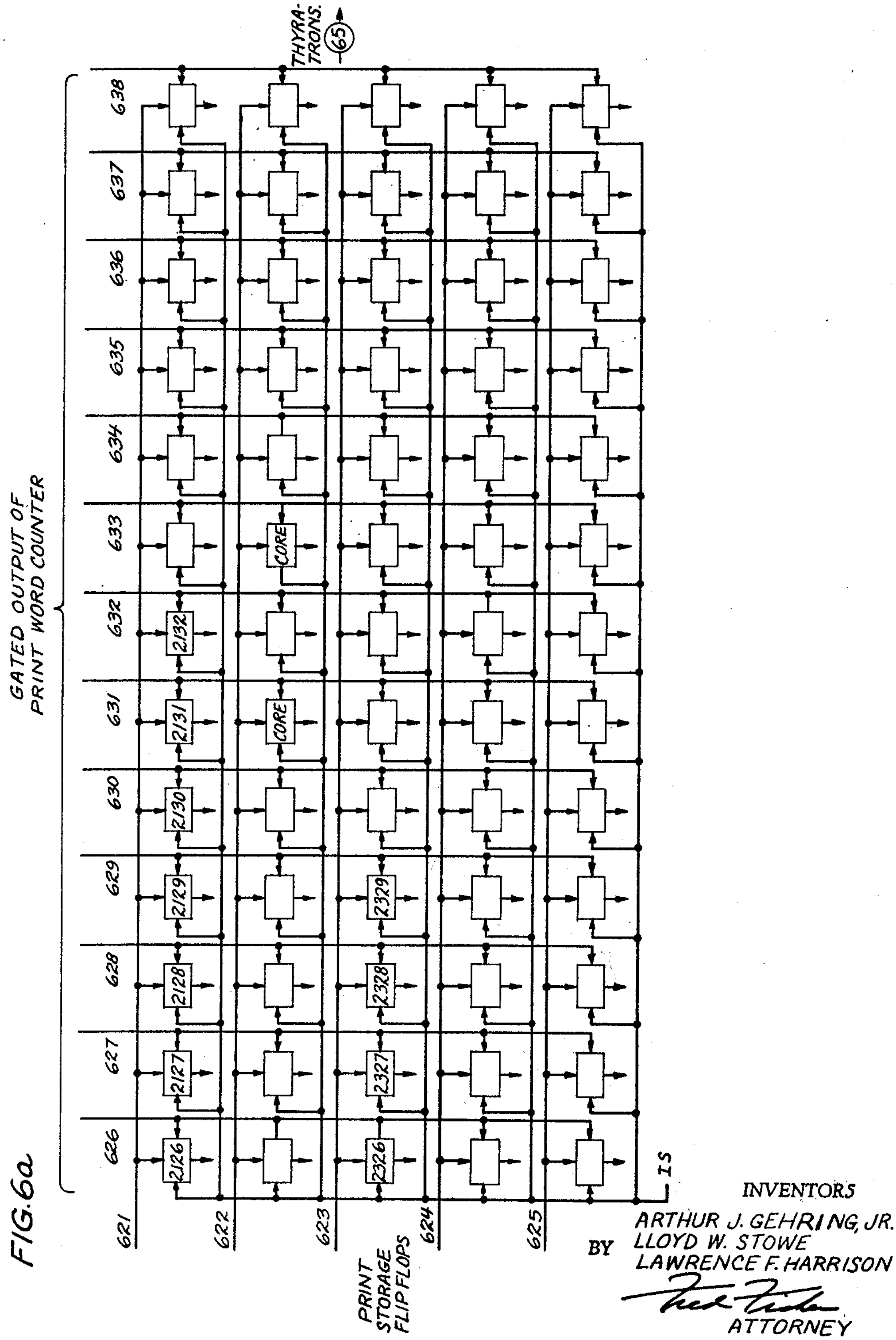
Figure 6B:
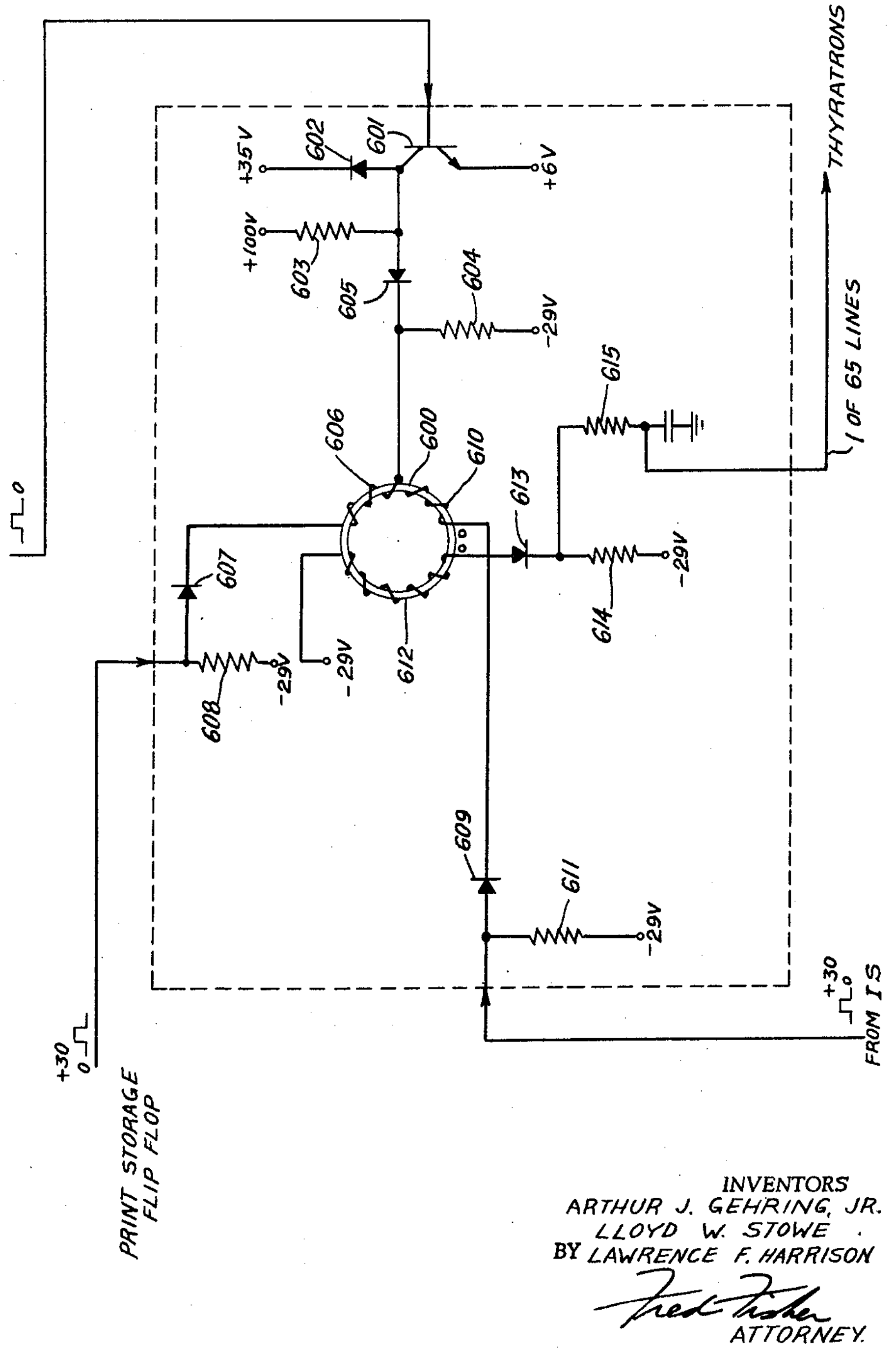
Figure 7:
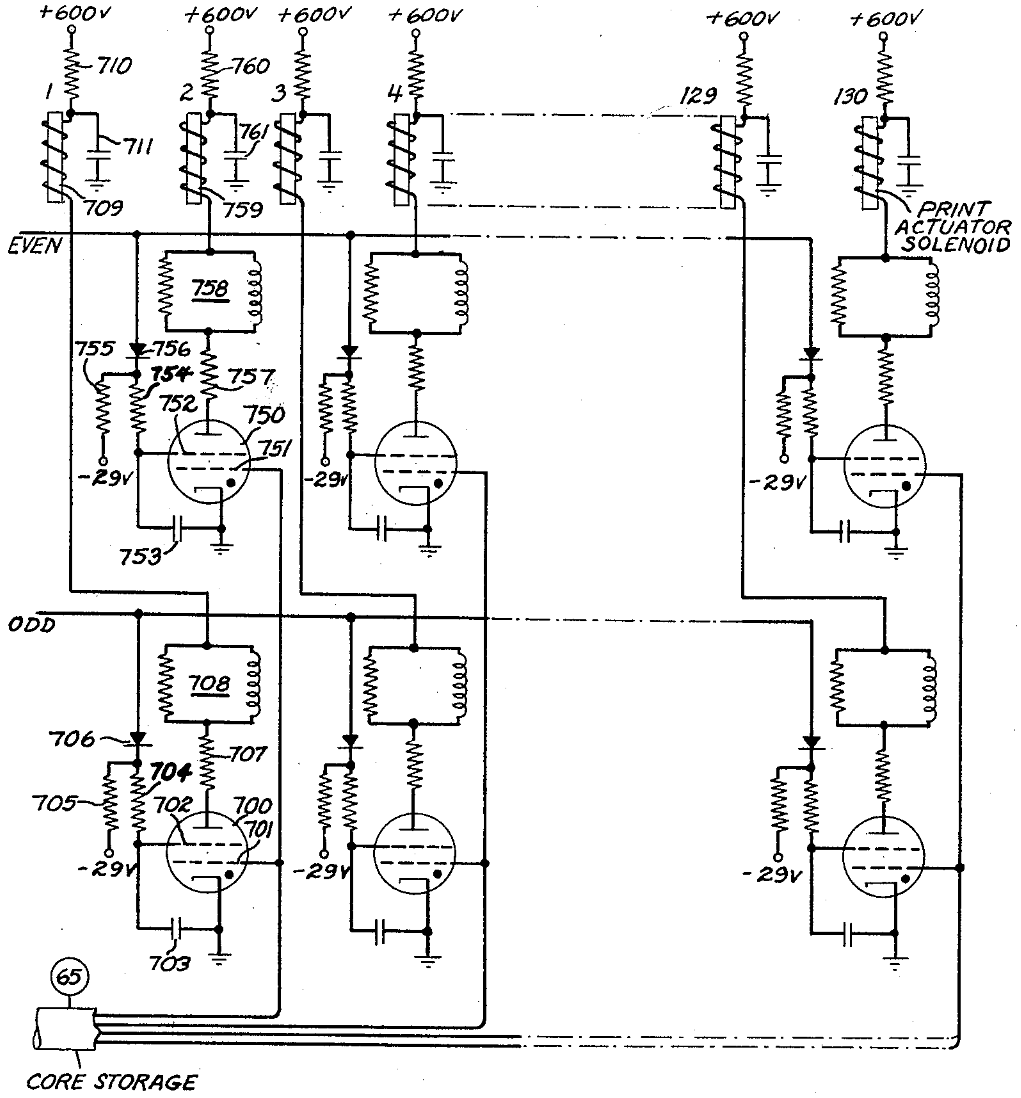
Figures 8A, 8B:
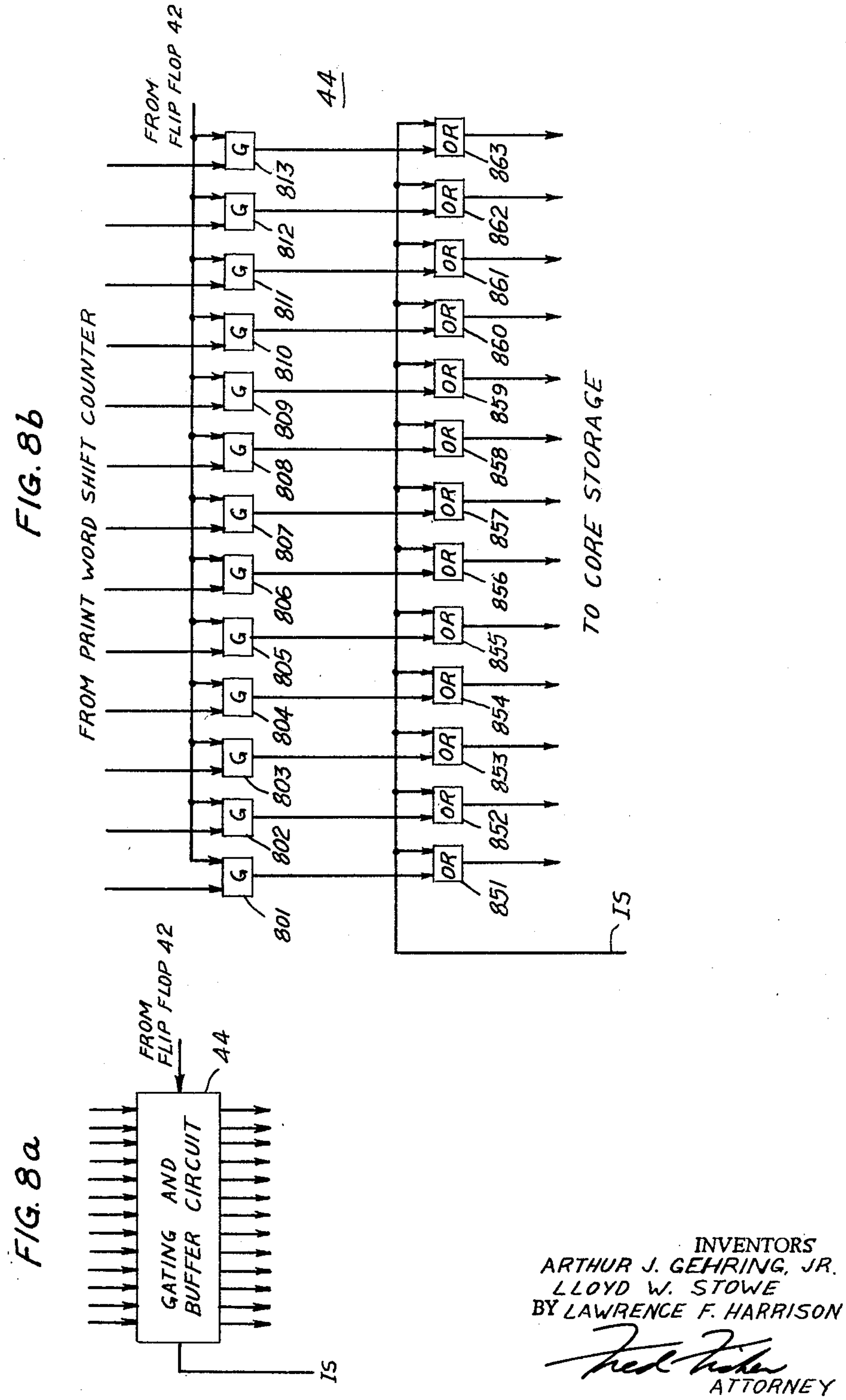
Figure 9A:
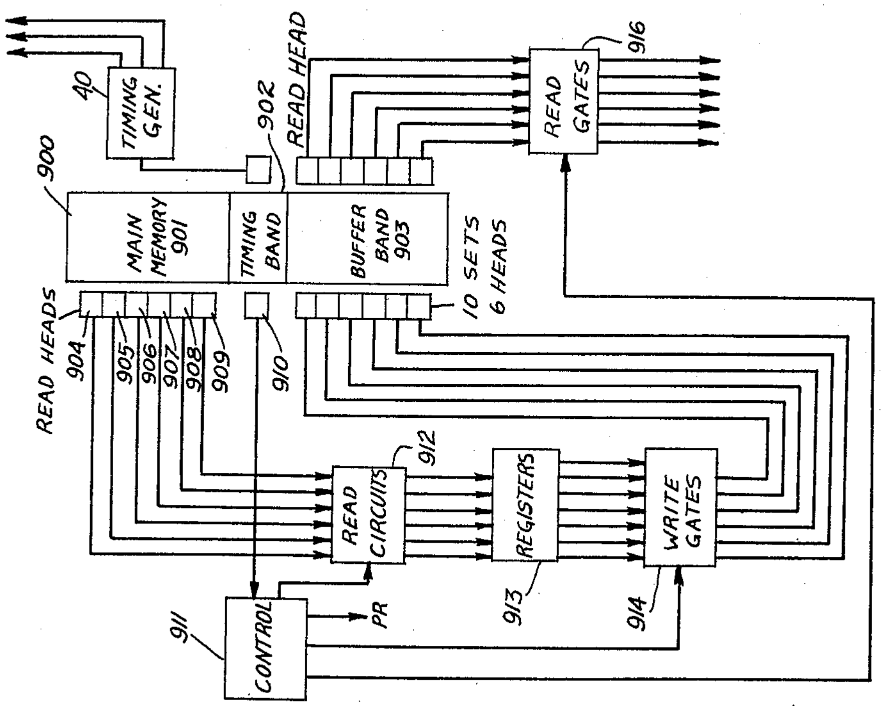
Figure 9B:
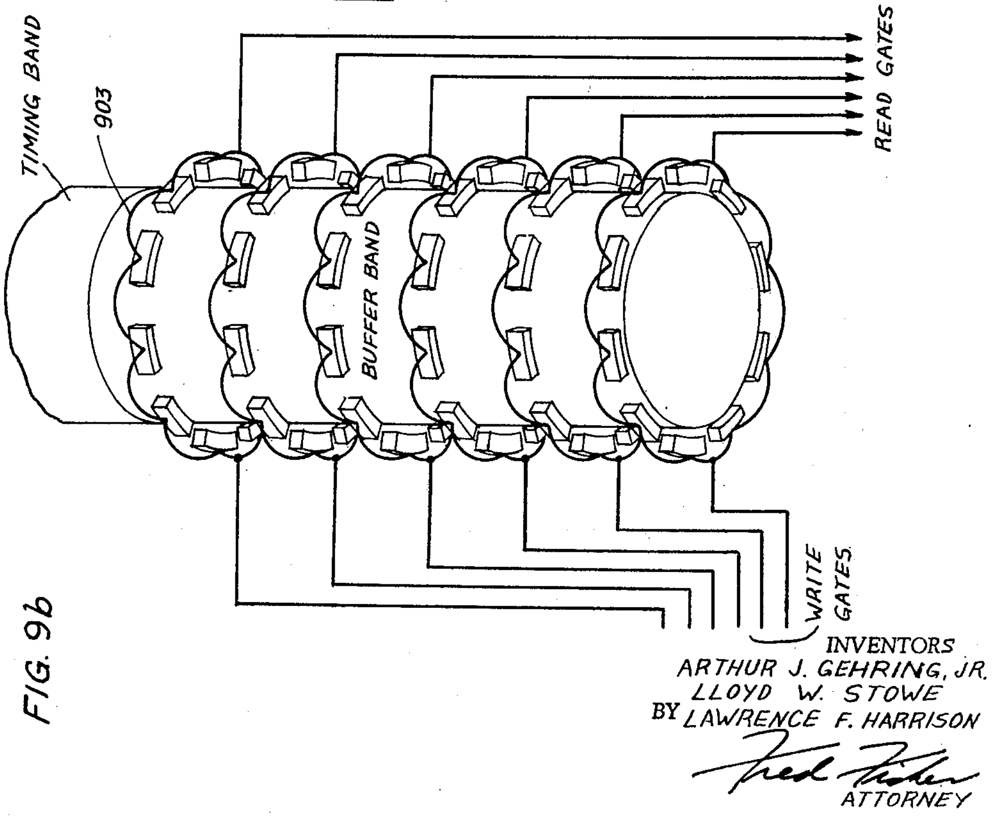

The novel features of this invention and other objects and advantages thereof, together with its organization and method of operation, will become more apparent from the following description, when read in connection with the accompanying drawings, in which:

Fig. 1 is a block diagram of a preferred embodiment of this invention;

Fig. 2*a* is a symbol for an "and gate and pulse former";

Fig. 2*b* is a block diagram of the "and gate and pulse former" symbolized in Fig. 2*a*;

Fig. 3*a* shows the symbols for a "print distributor" and "print storage flip-flops" and shows desired couplings therebetween;

Fig. 3*b* is a block diagram of the print distributor and print storage flip-flops symbolized in Fig. 3*a*;

Fig. 4*a* is a symbol for "final code storage flip-flop";

Fig. 4*b* is a block diagram of the final code storage flip-flops symbolized in Fig. 4*a*;

Fig. 5*a* is a symbol of a "print comparator";

Fig. 5*b* is a block diagram of the print comparator symbolized in Fig. 5*a*;

Fig. 6*a* is a block diagram of a core storage;

Fig. 6*b* is a schematic of one of a number of core units used in the core storage of Fig. 6*a*;

Fig. 7 is a schematic of thyratrons and print hammer actuators, shown in block form in Fig. 1;

Fig. 8*a* is a symbol of a "gating and buffer circuit";

Fig. 8*b* is a block diagram of the gating and buffer circuit symbolized in Fig. 8*a*;

Fig. 9*a* is a block diagram of a magnetic drum and its associated circuitry for providing input signals to the circuit of Fig. 1; and Fig. 9*b* illustrates, in perspective, the coupling of magnetic heads with the drum shown in Fig. 9*a*.

Referring to Fig. 1, there is shown a typewheel 10 having 130 type columns in staggered relation. All of the corresponding type elements in the odd type columns, that is, the 1st, 3rd, 5th, . . . and 129th columns, are aligned with each other to form rows of "odd" column type. The corresponding type elements in the even type columns, the 2nd, 4th, 6th, . . . and 130th columns, are aligned with each other, in staggered relation with the odd columns, to form rows of "even" column type. The typewheel 10 is rotated by a motor **10*a* about an axis 11 to which a code drum 12 is coupled. Each of the type columns has an associated print hammer 14, that is, 130 print hammers for the 130 type columns. Each of the type columns of the type wheel 10 has a plurality of type elements equally spaced about the periphery of the typewheel 10. In one embodiment, 51 different characters are used for each type column: 26 alphabetic characters, 10 numeric characters, and 15 special symbol characters (such as punctuation). The typewheel 10 is rotated at speed sufficient to print 600 lines per minute which corresponds to a printing rate of 1300 characters per second. When the like characters on the "odd" type columns pass under the print hammers, a magnetically recorded signal on the code drum 12 is sensed by appropriate reading heads, and amplified by a code generator 16 to produce, for example, a 6 bit parallel binary electrical code on its output lines indicative of the next different character to come under the print hammers 14. Seven output lines from the code generator are shown: Six lines to represent an alpha-numeric binary code, and one parity-bit line which is also used for synchronizing purposes. Also, the code drum 12 carries a separate sprocket signal track on which is recorded a series of pulses which are to be detected by a separate reading head and amplified by a sprocket pulse generator 18. The sprocket pulse generator 18 produces a pulse as each row of type characters approaches the printing hammers; one sprocket pulse after the generation of a code by the code generator 16, and another sprocket pulse before the occurrence of the next code from the code generator 16. Thus, the sprocket pulse generator 18 generates two successive pulses per each code produced by the generator 16**.

The code generator 16, which amplifies the magnetically recorded pulses on the code drum 12, provides the coded signal as momentary pulses on the output lines. In order that this coded signal be utilized to the fullest extent by the system, it is desirable that this instantaneous signal be temporarily stored by a storage unit. Therefore, the seven output lines of the code generator 16 are coupled to set a seven-stage register of initial code storage flip-flops 20. A six-stage register, termed final code storage flip-flops 22, is coupled to the six-line signal output of the initial code storage flip-flops 20. The final code storage flip-flops 22 and its function is described in detail in connection with Fig. 4*b*.

The 130 characters, 13 words each 10 characters long, which represent the line of information to be printed out are stored in a dynamic memory device 24. Device 24 delivers the characters comprising the line of information one after another in regular time succession. Each character is represented by a six binary bit parallel code appearing on six output lines wherein the time interval between successive output characters is equal to a character or "digit" period, and wherein all 130 characters recirculate cyclically. In a typical example, source 24 may provide 12 digit periods per word, although only 10 periods are used to store the 10 characters of a word, with the 13 words comprising the line recirculating at a rate of 3500 complete recirculations per second. Thus, the 130 characters from the information input device recirculate approximately 3 times during the period that each row of characters is under the print hammers.

The six-bit per character code generated by the information input device corresponds to the six-bit per character code provided by the code generator. A seventh bit is used for parity purposes and for synchronizing the odd-even flip-flop. A suitable code is illustrated below; other codes may, of course, be used.

| Pulse Code | Character | Pulse Code | Character |
|---|---|---|---|
| 1 010100 | A | 0 111000 | V |
| 0 010101 | B | 1 111001 | W |
| 0 010110 | C | 1 111010 | X |
| 1 010111 | D | 0 111011 | Y |
| 1 011000 | E | 1 111100 | Z |
| 0 011001 | F | 1 000011 | 0 |
| 0 011010 | G | 0 000100 | 1 |
| 1 011011 | H | 1 000101 | 2 |
| 0 011100 | I | 1 000110 | 3 |
| 1 100100 | J | 0 000111 | 4 |
| 0 100101 | K | 0 001000 | 5 |
| 0 100110 | L | 1 001001 | 6 |
| 1 100111 | M | 1 001010 | 7 |
| 1 101000 | N | 0 001011 | 8 |
| 0 101001 | O | 1 001100 | 9 |
| 0 101010 | P | 1 010010 | period (.) |
| 1 101011 | Q | 1 010001 | comma (,) |
| 0 101100 | R | 0 010011 | semi-colon (;) |
| 1 110101 | S | 0 000010 | hyphen (-) |
| 1 110110 | T | 0 110100 | percentage (%) |
| 0 110111 | U | 0 100011 | slash (/) |

The signals from the information input device 24 and the code stored in the final code storage flip-flops 22 are coupled to a print comparator 26 which produces outputs indicative of a comparison, or non-comparison, at its inputs. The output of the print comparator 26 is switched into either of two paths, so as to place the output signals from the comparator in one path during the time that the "odd" characters of the line of information are being compared and in the other path during the time that the "even" characters of this line of information are being compared. The output is therefore applied to a pair of "and" gates 28, 30 to provide the two separate paths. The output of the "and" gate 30 is applied through a delay 32 of one digit period to a print distributor 34. The output of the "and" gate 28 is applied directly to the print distributor 34. The output of the delay 32 and the output of gate 28 would occur, one delayed from the other, except for the action of the "and" gates 28, 30. Energizing inputs are so applied to the gates so that, first, both gates are never open simultaneously; second, neither gate is open in the absence of a print signal, PR, from the computer; and third, both gates are closed during print-out, as described hereinafter. Timing pulses obtained from a timing generator 40, synchronized with the character period of source 24 and occurring during alternate character periods are applied to the print distributor 34 to distribute alternate comparisons, as described in greater detail hereinafter in connection with Fig. 3*b*. The print distributor 34 provides five output lines for carrying the results of alternate comparisons of one word. The five output lines of distributor 34 are coupled to a five-stage register, shown as print storage flip-flops 36 (described in greater detail in connection with Fig. 3*b*). The print storage flip-flops 36 temporarily store the output of the print distributor 34 and provide five corresponding output lines, each of said lines representing a comparison for the 1st, 3rd, 5th, 7th, and 9th character of a word respectively, or the 2nd, 4th, 6th, 8th, and 10th character of a word respectively, depending upon which one of the two gates 28, 30 is open. The five output lines from the print storage flip-flops 36 are coupled to five rows of thirteen columns of a storage matrix 46, which may, for example, be a core storage. The input device 24, as stated above, provides signals representing a line of information to be printed, wherein each line comprises 130 characters, wherein there are 13 words each, each word having 10 characters. A character may include alpha-numeric, punctuation, a special symbol, and/or a space representation. Thus, the core storage 46 has five rows which represent the alternate comparisons of a 10 character word; the 13 columns represent the number of words per line. It will be appreciated that other combinations of rows and lines could be devised, and that other word lengths may be used.

The core storage 46 comprises a plurality of core units as described hereinafter in connection with Fig. 6*b*. The core unit is "set" or placed in its "1" state by the simultaneous application of appropriate voltage levels applied on two input windings. Thus, by applying an appropriate voltage level to the "row" windings of the second row of core units (from the print storage flip-flops 36, for example), and an appropriate level to the "column" windings of the first column of core units, the core unit at column one, row two is "set." A print word shift counter 38 synchronized with the word rate of source 24 provides a voltage pulse, at one column at a time, to the core storage 46. The timing of the counter 38 is controlled by timing pulses from the timing generator 40. The latter element may be, for example, a delay line with a plurality of intermediate taps (one tap per each code character period of a word), a timing track on a magnetic drum, or the like. The timing generator is synchronized with signals from the information input device 24. The print word shift counter 38 is shifted or "stepped" once per word time, and is reset once per line time.

The print word shift counter 38 is of a conventional type. In the embodiment described, this counter 38 has thirteen different states, and is shifted by a timing pulse $t_5$ from the timing generator, once per word time. A reset pulse, provided by the information input device, resets the print word shift counter, once per line time, so as to synchronize the input signals with the proper place of storage. That is, the print word shift counter 38 is reset at such a time so as to provide an output signal on its "column one" line when the first word comparison is provided by the print storage flip-flops 36. When shifted, the print word shift counter 38 provides an output on its "column two" line when the second word comparison is provided by the print storage flip-flops 36, and so forth.

The output of the print word shift counter 38 is coupled, in timed relation, to the core storage 46 by means of a gating and buffer circuit 44. The timed coupling is controlled by the output of a flip-flop 42. (The gating and buffer circuit 44, shown in greater detail in Fig. 8*b*, is explained in greater detail hereinafter.) The flip-flop 42 provides an enabling output to the gating circuit during the interval when an output is available from the print storage flip-flops 36; the flip-flop 42 is reset to provide no output during the transition period when the print storage flip-flops 36 are reset and when the print word shift counter 38 is shifted to insure that no faulty information is stored in the core storage 46. Each of the sixty-five outputs of the core storage 46 is applied, through 65 lines, to one grid of a respective pair of the one hundred thirty thyratrons 48. Each of the thyratrons 48 is coupled to a corresponding print-hammer actuator 50. Each of the print hammer actuators 50 is adapted to actuate a print hammer 14 so as to strike an inked ribbon 52 against printing paper 54.

The output of the sprocket pulse generator 18 is coupled to one input, each, of a pair of gates 56, 58. A second input of the gate 56 is coupled to the 7th output line of the initial code storage flip-flops 20 (which carries the parity-bit pulse). The gate 56, which is an "and" gate, provides an output upon the simultaneous presence of signals at both of its inputs.

This output from the gate 56 is coupled to the reset terminal R of an "odd-even" flip-flop 60. A second input of the gate 58 is also coupled to the 7th output line of the initial code storage flip-flops 20. The presence of a signal at the second input of the gate 58 acts to inhibit the gate 58. Thus, an output is provided from the gate 58 only upon the simultaneous presence of a sprocket pulse applied to its first input and the absence of a signal applied to its second input. The output of the gate 58 is coupled to the trigger input terminal T of the "odd-even" flip-flop 60. The "odd-even" flip-flop 60 may be a bi-stable circuit of the Eccles-Jordan type, wherein a pulse applied to the reset terminal R causes the flip-flop 60 to achieve one state of operation, and a pulse applied to the trigger terminal T causes the flip-flop 60 to "trigger" or change its state of operation. The "odd-even" flip-flop 60 has two steady states of operation: a set state, and a reset state. The flip-flop 60 operates in its reset state upon the occurrence of a pulse applied to its reset terminal R and is set by a subsequent pulse applied to the trigger terminal T. The next pulse at the trigger terminal T resets the flip-flop 60. The set output terminal of the flip-flop 60 is coupled to one input of a two-input "and" gate 62. The output of the sprocket pulse generator 18 is coupled to the second input of the "and" gate 62. The output of the "and" gate 62 is coupled to the "reset and gate in" terminal of the final code storage flip-flops 22. The presence of an output signal from the "and" gate 62 causes the final code storage flip-flops 22 to reset and causes the code that is stored in the initial code storage flip-flops 20 to gate into the final code storage flip-flops 22. The flip-flops 22 are described in greater detail in connection with Fig. 4*b*.

The parity bit line from the initial code storage flip-flops 20 is connected to the "and" gate 56 so that the "odd-even" flip-flop 60 may be reset by a sprocket pulse when the parity bit line is "high." Although the parity bit line is "high" only for certain code combinations, it should be noted that the parity bit line is always "low" during the absence of a code. Eventually, however, upon the occurrence of subsequent character codes generated, a "high" parity is provided to reset the flip-flop 60. Once the "odd-even" flip-flop 60 is reset by the parity line, the flip-flop 60 will be synchronized with the code wheel 10 by sprocket pulses applied to the trigger terminal of the flip-flop 60. The "odd-even" flip-flop 60, therefore, is synchronized with the odd and even rows of type on the type wheel 10 during the "warm up" period of the system. It will be appreciated that, due to the high speeds involved, the odd-even flip-flop 60 is synchronized in a fraction of a second. Alternatively another character bit line may be used, in lieu of the parity bit line, for resetting the flip-flop 60. Furthermore, the "odd-even" flip-flop 60 can be reset upon the presence of every code from the initial code storage flip-flops 20 by coupling the flip-flops 20 outputs through an "or" circuit to the "and" gate 56. However, the described embodiment is preferable because it obviates the necessity of using an additional "or" circuit in the system.

The pulses from the sprocket pulse generator 18 also are applied to a set input terminal S of a flip-flop 64, identified as an IS1 flip-flop. The set and reset outputs, respectively, of the IS1 flip-flop 64 are applied through a pair of gates 66 and 68 to the set and reset inputs of an IS2 flip-flop 70. A timing pulse from the timing generator 40 is coupled to energize the gates 66, 68 thereby placing the IS2 flip-flop 70 in the same state as the IS1 flip-flop 64. The timing pulses then operate to reset the IS1 flip-flop 64. The set output of the IS2 flip-flop 70 is coupled to reset the initial code storage flip-flops 20. The set outputs of the IS1 and IS2 flip-flops 64, 70 are coupled through a buffer, or "or" circuit 72. The output of the "or" circuit 72 inhibits the "and" gates 28, 30, resets the print storage flip-flops 36, and couples to the gating and buffer circuit 44 as described in greater detail hereinafter. In addition, the output of the buffer 72 is applied to sample the core storage 46 to provide outputs therefrom for application to the first grids of the thyratrons 48. Further, the output of the buffer 72 is applied to "and" gates and pulse formers 74, 76. An "and" gate and pulse former is described in greater detail below in connection with Fig. 2*b*. The set output of the "odd-even" flip-flop 60 is coupled to a second input of the "and" gate and pulse former 76. The reset output of the flip-flop 60 is applied to a second input of the "and" gate and pulse former 74. A sprocket pulse, from the sprocket pulse generator 18, is delayed by a delay means 78 and is applied to the third inputs, respectively, of the "and" gates and pulse formers 74, 76. Upon the coincidence of the presence of energizing levels at its three inputs, an "and" gate and pulse former produces a signal at its output. The delay 78 has a dual function: first, it insures that the "and" gate and pulse formers present outputs at a time when the IS level and the odd-even flip-flop 60 are at a steady state; second, it insures that the firing of the thyratrons occur at the precise interval when the printing hammers are immediately opposed the character type on the type columns 10.

The "and" gate and pulse former 74 has its output coupled to all of the second grids of alternate (even) thyratrons. The "and" gate and pulse former 76 has its output coupled to all of the second grids of all the other (odd) thyratrons. Upon the coincidence of signals present on both the first and second grids of a thyratron, the thyratron fires and actuates its corresponding print hammer as described below.

Instruction levels, such as the control signal PR, are applied to the "and" gates 28 and 30 from an external source, such as a computer. The PR signal instructs the system that a printing operation is to commence. When the PR signal is absent, distribution of comparisons by the print distributor is inhibited, although data previously compared may be printed.

Upon the application of a PR signal, the comparisons produced by the print comparator 26 are passed through the "and" gates 28 and 30 to the print distributor 34, and hence stored in the core storage 46. Subsequently, the thyratrons 48 are actuated to cause appropriate hammers to be actuated.

More specifically, the operation of the information reproducing system is as follows. The code generator 16 amplifies the coded signal stored on the code drum 12 and thereby produces a code corresponding to the next different type character to appear under the hammers 14. The code from the code generator 16 sets six of the flip-flops 20 to store the 6 bit code produced by the code generator 16 and may set the seventh flip-flop upon the generation of a new code character. Subsequently, the "first" pulse from the sprocket pulse generator 18 is applied to the gates 56, 58. The output of the 7th flip-flop in the code storage 20 inhibits the gate 58 and applies a permissive signal to the gate 56, thereby applying a reset pulse to the flip-flop 60 with the first sprocket signal. In the meantime, before the flip-flop 60 "flips" to reset, the sprocket pulse and the previously set condition of flip-flop 60 coincidentally activates the "and" gate 62 to produce an output therefrom. This output resets the final code storage flip-flops 22 and "gates in" the code stored in the initial code storage flip-flops 20. The first sprocket pulse also sets the IS1 flip-flop 64 which subsequently sets the IS2 flip-flop 70 in response to the timing pulse $t_1$ produced by the timing generator 40. The IS2 flip-flop set output resets the initial code flip-flops 20.

At this time, the "odd-even" flip-flop 60 is in its reset state. The reset output from the flip-flop 60 is applied to activate the "and" gate and pulse former 74. The "and" gate and pulse former 74 is further activated by the IS signal from the buffer 72 and by a delayed sprocket pulse from delay 78 to open the "and" gate 74 and apply a signal to the second grids of the even thyratrons 48. The IS level is also applied to sample the core storage 46 to read out the information stored in the cores to cause a line to print out of alternate (even) characters corresponding to the code previously stored in the final code storage flip-flops 22.

The timing generator resets the IS flip-flops 64, 70 thereby removing inhibit signals from the "and" gates 28, 30. The input signal from the information input device 24 is compared, character by character, with the code now stored in the final code storage flip-flops 22, by the print comparator 26. The gate 28 is opened by the reset output of the "odd-even" flip-flop 60, and the "and" gate 30 is closed due to the absence of a permissive signal from the set output of the "odd-even" flip-flop 60.

The output from the "and" gate 28 produces, in sequential order, comparisons to instruct whether or not each successive character is to be printed. However, the print distributor causes only every other comparison to be distributed, as described above. In accordance with the timing illustrated, only the "odd" comparisons from the "and" gate 28 are distributed, and gated into the print storage flip-flop 36.

The print storage flip-flop 36 provides five output lines for representing, at this time, the odd characters (1st, 3rd, 5th, 7th, and 9th) of a word. The print word shift counter 38 is shifted by a timing pulse designated $t_5$ at every word time, whereby the core storage 46 stores comparisons for all the odd characters of one line; that is, comparisons of the 1st, 3rd, 5th, . . . 129th characters for one line of type.

Subsequently, the second sprocket pulse is generated to cause the odd characters stored in the core storage 46 to print out and to cause the comparisons for even characters to occur and to be stored in the core storage 46. This condition occurs because the second sprocket pulse sets the flip-flops 60 through gate 58 and the output from the set side of the "odd-even" flip-flop 60 activates the gate 30, wherein the gate 28 is no longer activated. Successive signals from the comparator 26 pass through the "and" gate 30 and the delay 32 to the print distributor 34. The delay 32 operates to delay the train of comparisons one character time. Therefore, only even characters are distributed by the distributor 34.

As an example, suppose it is desired to print the word ABATTUTA, as shown in the chart below. Initially, assume that the code generator produces a code for the character A. The first sprocket pulse opens gate 28 and directs the "odd" A's (the first and third characters) to be stored in the core storage 46. The second sprocket pulse directs the first and third characters (the odd A's) to be printed and further opens gate 30 to cause the eighth character (even A) to be stored in the core storage 46. Subsequently, the code generator 16 produces a code for the character B. The first sprocket pulse, following, causes the even A (the 8th character) to be printed and the odd B's (none in the example) to be stored. The second sprocket pulse causes the odd B's to be printed (none) and the second character (an even B) to be stored. Subsequently, the code generator produces a code for the character C. The first subsequent sprocket pulse causes this second character (an even B) to be printed and would further cause the storage of odd C's (none, for this example).

Subsequently, the code generator produces a code for the character T. The first sprocket pulse, following, causes the odd T's to be stored (the 5th, and 7th characters). The second sprocket pulse causes the 5th and 7th characters (odd T's) to be printed and also causes the even T's (the 4th character) to be stored. Subsequently, the code generator produces a code for the character U. The first sprocket pulse causes the even T, that is, the 4th character to be printed and odd U's (none)

to be stored. The following sprocket pulse causes the even U's (the 6th character) to be stored and the odd U's to be printed. The code generator, subsequently, produces the code for the following character, which may be the letter V. The first sprocket pulse, therefore, causes this even U to be printed (the 6th character). Therefore, in one revolution of the typewheel 10, the word ABATTUTA is completely printed.

| | A | B | A | T | T | U | T | A |
|---|---|---|---|---|---|---|---|---|
| Code A generated: | | | | | | | | |
| Sprocket pulse, odd A's stored, even % printed | Store A | | Store A | | | | | |
| Sprocket pulse, even A's stored, odd A's printed | Print A | | Print A | | | | | Store A |
| Code B generated: | | | | | | | | |
| Sprocket pulse, odd B's stored, even A's printed | | | | | | | | Print A |
| Sprocket pulse, even B's stored, odd B's printed | | Store B | | | | | | |
| Code C generated: | | | | | | | | |
| Sprocket pulse, odd C's stored, even B's printed | | Print B | | | | | | |
| Sprocket pulse, even C's stored, odd C's, printed | | | | | | | | |
| Code T: | | | | | | | | |
| Sprocket pulse, odd T's stored, even S's printed | | | | | Store T | | Store T | |
| Sprocket pulse, even T's stored, odd T's printed | | | | Store T | Print T | | Print T | |
| Code U: | | | | | | | | |
| Sprocket pulse, odd U's stored, even T's printed | | | | Print T | | | | |
| Sprocket pulse, even U's stored, odd U's printed | | | | | | Store U | | |
| Code V: | | | | | | | | |
| Sprocket pulse, odd V's stored, even U's printed | | | | | | Print U | | |
| Sprocket pulse, even V's stored, odd V's printed | | | | | | | | |

Referring to Fig. 2*b*, the "and" gate and pulse former 74 (and also 76), symbolized in Fig. 2*a*, is comprised of a flip-flop 200, "and" gate 201, and an inverter 202. (An inverter has a logical "not" function). The IS signal from the "or" gate 72, the delayed sprocket pulse, and an output from the odd-even flip-flop 60 are coupled to the three inputs of the "and" gate 201. The presence of these three signals sets the flip-flop 200. The IS level is coupled through the inverter 202 to the reset terminal of the flip-flop 200, so that the flip-flop is reset in the absence of an IS signal from the "or" gate 72. The output of the flip-flop 200 of the "and" gate and pulse former 74 is applied to the second grids of the even thyratrons. The output of the flip-flop 200 of the "and" gate and pulse former 76 is applied to the second grids of the odd thyratrons.

Referring to Fig. 3*b*, there is shown, in block diagram, the circuitry of the print distributor 34 and the print storage flip-flops 36, shown in symbolized form in Fig. 3*a*. As shown in Fig. 3*b*, the print distributor 34 comprises four flip-flops 300, 301, 302, 303. Each of the flip-flops 300–303 is set by the output of an "and" gate 304, 305, 306, 307, respectively. Each of the gates 304–307 is a two-input "and" gate. One input of each of the gates 304–307 is activated by the output of the print gates 28 or 30. Timed input pulses (from the timing generator 40) are applied successively to the second input of the "and" gates 304–307.

The timing generator 40, which, as previously indicated, may comprise a tapped delay line having as many taps as there are character periods in a word, generates, from each tap in succession, a series of equally spaced pulses designated $t_0$ to $t_{11}$ respectively and repeats the train of pulses in order. The period of time elapsed from a $t_0$ pulse to the next $t_0$ pulse is one word time. The time duration between successive pulses is one digit, or character, time. Therefore, the time duration from $t_{10}$ to $t_0$ is two digit times; the time duration from $t_0$ to $t_2$ is also two digit times; and the time duration from $t_2$ to $t_4$ is two digit times.

It will be recalled that each word comprises ten characters, and the timing of these signals applied by source 24 is such that the 1st character in a word occurs at the output of gate 28, when the gate is operative, at the instant that the timing pulse generator generates a $t_{10}$ timing pulse.

With this timing, the 3rd character occurs at the output of gate 28 at time $t_0$, the 5th character at time $t_2$, the 7th character at time $t_4$ and the 9th character at time $t_6$. When gate 30 is open and one digit delay 32 is operative the timing of input characters to the print gates is delayed one pulse period whereby the 2nd character occurs at the input to the print distributor 34 at time $t_{10}$, the 4th character at time $t_0$, the 6th character at time $t_2$, the 8th character at time $t_4$ and the 10th character at time $t_6$.

As shown in Fig. 3*b*, the pulse $t_{10}$ from the timing generator is applied to the "and" gate 304; the pulse $t_0$ is applied to the "and" gate 305; the pulse $t_2$ is applied to the "and" gate 306; the pulse $t_4$ is applied to the "and" gate 307; and the pulse $t_6$ is applied to the "and" gate 312. Therefore, alternate digit time pulses (except $t_8$) are applied to different "and" gates 304–307, 312. The presence or absence, respectively, of a comparison signal applied to the print distributor 34 during the time intervals $t_{10}$, $t_0$, $t_2$ and $t_4$ sets, respectively, the flip-flops 300 to 303. At time $t_6$, which occurs two digit times after $t_4$, the flip-flops 300 to 303 are reset and their outputs are simultaneously gated through "and" gates 308, 309, 310, 311. The comparison signal occurring at time $t_6$ is gated directly through the "and" gate 312. Therefore, the outputs of the gates 308, 309, 310, 311, 312 present comparisons for every other character of one word on five lines, in parallel, at time $t_6$. These five lines from the gates 308 to 312 are coupled, respectively, to the set terminals of flip-flops 313, 314, 315, 316, 317. The flip-flops 313 to 317 comprise the print storage flip-flops 36 of Figs. 1 and 3*a*. These flip-flops 313 to 317 are reset by the output of an "or" gate 318 whose inputs receive the IS signals and the $t_2$ timing pulse.

Referring now to Fig. 4*b*, there is shown a block diagram of the Final Code Storage Flip-Flops 22 shown in symbolized form in Figure 4*a*. The Final Code Storage Flip-Flops 22 comprise six flip-flops 401 to 406, each adapted to be set, respectively, by the outputs of six two-input "and" gates 411 to 416. The six input lines to the final code storage flip-flops 22 are applied, respectively, to one input of each of the "and" gates 411 to 416.

The output of the "and" gate 62 (see Figure 1) provides a "reset and gate in" pulse for the final code storage flip-flops 22. This pulse is applied to the second inputs of all the "and" gates 411 to 416 and also to the reset terminals of the flip-flops 401 to 406. This pulse resets all of the flip-flops 401, 402, 403, 404, 405, 406, and further activates each of the "and" gates 411 to 416, thereby permitting the flip-flops 401–406 to store the information stored in the initial code storage flip-flops 20. It will be appreciated, therefore, that this may be achieved by either: first, the insertion of a delay in each of the "and" gates 411 through 416 to cause the flip-flops 401–406 to selectively set after being reset; or the selection of a flip-flop having a property that a signal on the set terminal takes precedence over a simultaneous signal on the reset terminal.

The Print Comparator 26 (see Fig. 1) compares the output of the final code storage flip-flops 22 with the output of the information input device 24 to produce an output signal indicative of comparison. The print comparator 26 may be as shown in block diagram in Fig. 5*b*, and reproduced in symbol form in Fig. 5*a*. Six lines from the final code storage flip-flops 22 and six lines from the information input device 24 are coupled to the comparator 26. The comparator 26 compares the output of final code storage flip-flops 22 with the output of the information input device 24, and, upon comparison, produces an output signal labelled "Print." The first line 571 which carries, for example, the first signal bit of the 6 bit code from the final code flip-flop is coupled to a two-input "and" gate 501. The first line 583 which carries the first signal bit of the 6 bit code from the information input device is applied to the second input of the "and" gate 501. Upon the presence of simultaneous signals on both lines 571, 583, an output signal is produced by the gate 501. The input line 571 is coupled to an inverter 502 whose output is connected to an input of a two-input "and" gate 503. The input line 583 is coupled to an inverter 504 whose output is connected to the second input of the "and" gate 503. An output from the "and" gate 503 is produced upon the presence of signals on both inputs. Thus, upon the absence of a signal on the line 571 and the absence of a signal on the line 583, the "and" gate 503 produces an output level. The output of the "and" gate 501 is coupled to a buffer, or "or" circuit, 505. The output of the "and" gate 503 is coupled to a second input of the "or" circuit 505. The "or" circuit 505 produces an output, therefore, upon the coincidence of the same condition on the lines 571 and 583; that is, an output is obtained from the "or" circuit 505 only when the 571 and 583 line levels are identical. When both the line 571 is high and the line 583 is high, the output from the "or" circuit 505 is high. When the level on the line 571 is low and the level on the line 583 is low, the output from the "or" circuit 505 is high. However, when the levels present on the line 571 and on the line 583 are not coincident, that is, one is high and the other is low, then the output from the "or" circuit 505 is low.

In similar fashion, the second line 573 (second bit of the 6 bit code) from the final code storage flip-flop is coupled to one input of a two-input "and" gate 511; and the second input line 585 (second bit of the 6 bit code) from the information input device is applied to the second input of the "and" gate 511. The line 573 is coupled through an inverter 512 to one input of a two-input "and" gate 513 whose second input receives the output from an inverter 514 having its input coupled to the line 585 from the information input device. The outputs of the "and" gates 511 and 513 are coupled to an "or" circuit 515. In similar fashion, the lines 575, 577, 579, 581 from the final code flip-flops are coupled, respectively, to one input of two-input "and" gates 521, 531, 541, and 551. Similarly, the lines 587, 589, 591, 593 from the information input device are coupled, respectively, to the second input terminals of these gates 521, 531, 541, and 551. The lines 575, 577, 579, 581 are connected through inverters 522, 532, 542, 552, respectively, to one input, respectively, of two-input "and" gates 523, 533, 543, and 553. Similarly, lines 587, 589, 591, 593 are connected, respectively, through inverters 524, 534, 544, and 554, respectively, to the second inputs of the "and" gates 523, 533, 543, and 553. The outputs of the "and" gates 521 and 523 are coupled to an "or" gate 525; the outputs from the gates 531 and 533 are coupled to an "or" gate 535; the outputs from the "and" gates 541, 543 are coupled to an "or" gate 545; and the outputs from the "and" gates 551 and 553 are coupled to an "or" gate 555. The outputs of the "or" circuits 505, 515, 525, 535, 545, and 555 are coupled to a six-input "and" gate 570. The "and" gate 570 produces an output only when the levels, or signals on lines 571, 573, 575, 577, 579, 581 coincide with that on the lines 583, 585, 587, 589, 591, 593.

An inverter is a device for producing the function of inversion. One input signal is supplied to an inverter, and the binary value of the output signal is opposite to that of the input signal. In other words, the output is 1 only when the input is 0. The word NOT is commonly used in referring to the function of inversion, and it is said that if the input signal is A and the output is C, then C is equal to NOT A. A convenient symbol for inversion is a bar over the inverted variable. The equation for this function would be $C=\bar{A}$.

The storage 46 may use any type of bistable storage units; however, for high speed and economy of operation, a core storage is preferable. The core storage 46 utilizes one core per stage.

Referring to Fig. 6*a*, the core storage 46 includes 65 core units. Each one of these core units is identical; one core unit is shown (within dotted lines) in Fig. 6*b*, and is described hereinafter. The core storage 46 comprises thirteen columns of five rows each. Each of the thirteen columns of five core units each is coupled, respectively, to one of the thirteen lines from the gated output of the print word counter gating and buffer circuit 44. Each one of the five rows of thirteen core units each is coupled, respectively, to receive one of the five outputs from the print storage flip-flops 36. Therefore, upon the presence of signals at both row line 621 and column line 626, core unit 2126 is set. Similarly, upon the presence of signals at both row line 623 and column line 627, the core unit 2327 is set. The column lines 626 to 638 are activated in successive order each word time. During the first word time column line 626 is activated. The comparisons present on the row lines 621, 622, 623, 624, 625 are read into the first column of core units 2126, 2226, 2326, 2426, 2526. During the second word time, the line 627 from the gating and buffer unit 44 is activated; the column line 626 becomes deactivated. Signals on the row lines 621–625, from the print storage flip-flops are, respectively, read into the core units 2127, 2227, 2327, 2427, 2527, constituting the second column of core units.

Fig. 6*b* shows the circuit for a core unit. A square hysteresis loop type core 600, normally in one state, is placed in a second state upon the simultaneous presence of signals from the print storage flip-flops and from the gating and buffer circuit 44. However, if the two lines do not carry a simultaneous signal, the core 600 remains in its one state. The emitter of an NPN transistor 601 is coupled to a potential source, such as +6 volts. The collector of the transistor 601 is coupled to the anode of a diode 602 having its cathode coupled to a more positive source potential, such as +35 volts. The transistor 601 is normally biased non-conducting in the absence of a positive pulse applied to the base of the transistor 601. The collector of the transistor 601 is coupled through a resistor 603 to a source of higher positive potential, such as +100 volts. A negative potential source of −29 volts is coupled by a resistor 604 to the cathode of a diode 605 whose anode is connected to the collector of the transistor 601. Therefore, in the absence of a pulse present at the base of the transistor 601 (i.e. in the absence of a pulse from the print word counter gating circuit) the transistor 601 is biased off.

Because the base of the transistor 601 is more negative than the emitter, no current flows through the transistor 601. Current flows from the +100 volt source, through resistor 603, and the diode 602 to the +35 volt source. The potential of the collector of the transistor 601 is, therefore, approximately +35 volts. Current also flows through the diode 605 and through the resistor 604 to the −29 volt source. The potential, therefore, of the cathode of the diode 605 is also approximately +35 volts. The cathode of the diode 605 is coupled to the one terminal of a core winding 606. The other terminal of the winding 606 is connected to the cathode of a diode 607 whose anode is coupled through a resistor 608 to a negative potential source of −29 volts. No current flows through the winding 606 due to the back impedance of the diode 607. When a positive signal of approximately +30 volts is supplied to the anode of the diode 607 from the print storage flip-flop, there is not sufficient potential difference to cause a current flow through the core winding 606 when the transistor 601 is cut off. However, when a pulse, exceeding +6 volts, is supplied from the print word counter gating and buffer circuit, the base-to-emitter bias of the transistor 601 is such to cause conduction between the collector and the emitter. The potential of the collector of the transistor 601 therefore approaches +6 volts, thereby causing the cathode of the diode 605 to approach +6 volts. However, in the absence of a signal from the print storage flip-flops, there is no current flow through the core winding 606, due to the back bias of the diode 607. However, in the presence of both a signal from the print storage flip-flops and from the print word counter gating and buffer circuit, the cathode of the diode 605 has a potential of +6 volts and the anode of the diode 607 has a potential of +30 volts. The potential difference causes current to flow through the diode 607 and through the core winding 606 thereby causing the core 600 to change its state or become "set."

The information stored in the core is read out when the IS line is "high," together with a pulse from the print word counter gating and buffer circuit. Current from the IS line, which may have a potential of +30 volts when "high," is applied through a diode 609, and through a core winding 610 which is in series with the core winding 606. The anode of the diode 609 is coupled through a resistor 611 to a −29 volt source. Normally, in the absence of an IS signal, the anode of the diode 609 is biased negatively, so that no current flows through the diode 609. However, when a positive pulse is present on the IS line, the diode 609 conducts, and, in the presence of a pulse from the print word counter gating and buffer circuit, the cathode of the diode 605 is approximately +6 volts. Therefore, a twenty-four volt potential difference exists across the coil 610. When the core is previously set, the IS signal is opposed by a high impedance caused by the set core; the core resets (changes to its one state) and causes a readout pulse from a winding 612 coupled to the core 600. When the core is not previously set, the IS signal does not cause an output to be read out from the read-out winding 612 due to a small impedance across the coils 610, 606. The coil 612 has one end coupled to a −29 volt source, and the other end coupled through a diode 613, through a resistor 614, to a −29 volt source. Upon resetting the core 600, a pulse is applied across the serially connected diode 613 and resistor 614. From the common connection of the diode 613 and resistor 614, an output is obtained and filtered by a low pass filter 615. The filtered output is then applied to the first control grids of an associated pair of thyratrons as described in greater detail below.

Referring to Fig. 7, there is shown the circuitry for the thyratrons 48 and the print hammer actuators 50. The core storage 46 provides sixty-five output lines. Each of the output lines from the core storage 46 is coupled to two different thyratrons. One is designated as an odd thyratron and the other is designated as an even thyratron. All of the odd thyratrons, that is, the 1st, 3rd, 5th, . . . 129th thyratron are coupled to receive, at their second grids, an output from the "and" gate and pulse former 76. All of the even thyratrons, such as the 2nd, 4th, 6th, . . . 130th are coupled to receive, at their second grids, an output from the "and" gate and pulse former 74. The output of the "and" gate and pulse former 76 is described below as the old signal; the output of the "and" gate and pulse former 74 is described as the even signal. The odd thyratron 700 and even thyratron 750, of each pair, have their cathodes coupled to ground. The first control grids 701 and 751 of each of the 65 pairs of thyratrons are coupled, respectively, to a respective one of the 65 output lines of the core storage 46. The second grids 702 and 752 of the thyratrons are coupled, through by-pass capacitors 703, 753, to ground to reduce noise surges. The second grids 702 and 752 are also coupled, respectively, through resistors 704, 705 and 754, 755, respectively to a potential source of −29 volts. The corresponding common connections of the resistors 704, 705 and 754, 755 are coupled, respectively, to the cathode of a diode 706, 756. The anode of the diode 706 is coupled to receive the odd signal; the anode of the diode 756 is coupled to receive the even signal. The anode of the first thyratron 700 is coupled through a resistor 707 and damping circuit 708 to one terminal of a first solenoid 709. The anode of the second thyratron 750 is coupled through a resistor 757, through a damping circuit 758, to one terminal of a second solenoid 759. The other terminal of each of the solenoids 709, 759, is coupled, respectively, to a resistor 710, 760 to a +600 volt source, and through a respective capacitor 711, 761 to a point of reference potential, such as ground. Therefore, upon the presence of simultaneous signals on the odd line and on the corresponding core storage line, the corresponding odd thyratron 700 is fired. Similarly, upon the coincidence of signals on the even line and one of the core storage lines, the corresponding even thyratron 750 is fired. The firing of a thyratron causes its corresponding solenoid to operate. Simultaneously, all the odd thyratrons, or the even thyratrons, for a particular character, are fired. That is, all the odd thyratrons are fired that correspond to the odd character A to be printed; then, the even thyratrons are fired that correspond to the character A to be printed; subsequently, all the corresponding odd thyratrons are fired that correspond to the character B; then, all the even thyratrons are fired that correspond to the character B; etc. Note, that prior to the firing of a thyratron 700, the +600 volt source charges the capacitor 711. Thus, when the thyratron is fired, the charge on the capacitor 711 is sufficient to actuate the solenoid 709, thereby reducing the surges of power that would otherwise be required from the power supply. After actuation of the solenoid the charge on the capacitor 711 is dissipated and the thyratron will quench.

Referring to Fig. 8*b*, there is shown the gating and buffer circuit 44 shown in symbol form in Fig. 8*a*. The gating and buffer circuit 44 couples the outputs of the print word shift counter 38 to the core storage 46, as shown in Fig. 1. The thirteen outputs of the print word shift counter 38 are coupled, respectively, to one input of thirteen two-input "and" gates 801–813. The second inputs of all the "and" gates 801–813 are coupled to receive an enabling input from the flip-flop 42. Upon coincidence of an enabling output from the flip-flop 42 and a "high" signal on one line from the print word shift counter 38, the one "and" gate of the gates 801–813 that is associated with the one "high" line produces a "high" output. Each of the outputs of the gates 801–813 is coupled, respectively, to one input of a corresponding buffer unit 851–863. Each of these buffer units (also termed "or circuits") 851–863 has a second input coupled to receive an IS signal. Therefore, the output of the gating and buffer circuit 44 provides a signal on only one output line when an IS signal is absent, simultaneously with the coincidence of a high level on one of the thirteen lines from the print word shift counter 38 and a high (enabling) output signal from the flip-flop 42. The gating and buffer circuit 44 provides output levels on all of its output lines when an IS signal is present during a printing operation. Thus it will be seen that the print word counter operates to read print information into the core storage 46 in sequence, while the IS signal operates to read out all the cores simultaneously.

Referring to Fig. 9*a*, there is shown an illustrative embodiment for the information input device 24. The input device 24 is applied to the print comparator 26 as shown in Fig. 1. A magnetic drum 900 includes a main memory portion 901, a timing band 902 where timing signals are recorded, and a buffer band 903 where information to be printed out is stored. Information is read in parallel from the main memory 901 (which may be in a six parallel bit per digit form, or other multidigit, code) by a group of reading heads such as 904, 905, 906, 907, 908, 909 at a time determined by the control 911. The timing is determined by a timing track 902 having a reading head 910. The control 911, which may be part of a general computer, produces a permissive signal to read circuits 912 to permit a selected word or group of words stored in the main memory 901 to be read out and to be stored in registers 913. Subsequently, the control unit 911 provides a signal to activate a set of write gates 914 to transfer the data stored in the registers 913 to a set of recording heads for recording on the buffer band 903. Ten sets of six parallel writing heads arranged as shown in Fig. 9*b* may be used for writing data on the buffer band 903. The ten sets are staggered in equiangular positions around the periphery of the drum 900 so as to record the identical information ten times about the drum. Referring to Fig. 9*b*, there is shown a perspective view of the drum with the associated buffer band heads. Each of the six tracks of the buffer band has ten associated writing heads for recording upon the buffer band. However, only one of the ten sets of heads need produce signals for reading out data through read gates 916. A separate set of read heads may be used. Alternatively, the same group of writing heads may be used for reading, since all these heads would read the identical information. If an entire line of print is to be typed out, information is transferred from the main memory portion until a total of thirteen words have been stored in the buffer band. Thereafter and upon a suitable instruction level from the control 911, the data stored on the buffer band is read out either from a separate set of read heads associated with the buffer band or from one set of the write heads through a group of read gates 916 to the comparator 26. Information, therefore, which is stored in the main memory 901 is transferred to the buffer band 903 and recorded at ten locations about the drum. Drum information may, therefore, be read out at a very high rate of speed (i.e. ten times per revolution of the drum 900) to the comparator. By supplying input information to the printer at a high rate, the printer is able to operate at its optimum speed, whereby printing is achieved at extremely high speeds.

The timing band 902 on the magnetic drum 900 also is coupled to a timing generator 40. The timing generator 40 may be as aforementioned a delay line having intermediate taps; other known techniques may be used for timing.

When a line is printed out, the print PR signal (applied to the "and" gates 28, 30) is removed from the printer and another line of up to thirteen words to be printed is read from the main memory 901 and transferred to the buffer band 903. When the entire line is stored in the buffer band 903, the print PR signal is selectively reapplied to the "and" gates 28 and 30 to recommence operations for a succeeding line.

Various control signals may be used, such as "end of paper," "faulty operation," and the like, to further inhibit the "and" gates 28 and 30 to prevent further printing output, or to cause the machine to cease operation in case of failure of components.

In summary, the information reproducing system prints a line of 130 characters. Sixty-five type columns are interlaced with sixty-five other type columns wherein two adjacent type columns are staggered. The characters on two adjacent print columns are staggered so that only 65 characters and not 130 characters at a time are in a position to print. The two print columns may be referred to as "odd" and "even" columns. All 65 "odd" A's for example, move in parallel into print position. All 51 characters in sequence move one at a time into print position, "odd" column first. The purpose of the staggered type on a typewheel is to prevent smudging. The 130 hammers are controlled by 130 actuators which are, in turn, controlled by 130 thyratrons. When one thyratron fires, the solenoid in its plate circuit is actuated to drive the print hammers toward the print wheel to print a character. The firing of the 130 thyratrons is controlled by the conditions of the 65 magnetic cores: A "set" core fires a thyratron, a "reset" core does not fire a thyratron. Only 65 cores are used to fire 130 thyratrons because each core controls both an "even" thyratron and an "odd" thyratron.

The process of comparing, setting, and sampling occurs 102 times or twice (even-odd) for each of the 51 characters to be printed.

The setting up and sampling of cores to print a character is controlled by signals produced each time a sprocket pulse is generated. Two pulses are generated per different character, that is, 102 sprocket pulses are generated for the 51 characters. The sprocket pulse which steps the "odd-even" flip-flop 60 to an odd cycle from an even cycle generates a signal, from the "and" gate 62, to reset and gate in a new character code to the final code storage flip-flops 22.

The IS signals, which are produced by the IS flip-flops each time a sprocket pulse occurs, inhibits the setting of cores during read-out. The IS1 and IS2 flip-flops 64 and 70 are so coupled to insure that an IS signal is available for at least one word time. A sprocket pulse (generated by the code drum 12) is not synchronized with the computer timing, so that a sprocket pulse may occur, asynchronously, as late as the pulse period immediately before the end of the word time.

This invention is not limited in scope to the particular use of core storage or of any other specific form or embodiment illustrated, but is only limited by the scope of the appended claims. Any desired storage may be used, such as bistable or tristable circuits; flip-flops using transistors, tubes, and the like, may be used where desired. Furthermore, the type columns may be in other staggered relationships, such as an alternate-three series, whereby every third column carries every third row of elements. In such an "alternate-three" embodiment, thyratrons may be activated by three sets of control inputs, thereby reducing the capacity of the core storage. The capacity of the core storage may be reduced by increasing the staggering of the typewheels, that is, if every fifth typewheel is in alignment (five sprocket pulses per code would be used), only one-fifth of 130, or 26, core units would be utilized. However, the preferable embodiment is to stagger only alternately by twos, whereby, by practicing this invention, core storage is reduced to half the number of storage units required by the teaching of the prior art. Information input may be provided by means other than drum circuits, such as for example, magnetic tape.

Having thus described this invention, what is claimed is:

1. A printer comprising means for generating coded signals characteristic of different characters to be printed; means for receiving input signals representative of characters in one line of type; means for comparing said coded signals with said input signals; means for storing a fraction of said comparisons at one time and for storing the remaining comparisons at another time; a plurality of print hammers equal in number to the total number of characters in one line of type for actuation by said storage means; and a typewheel having type elements and adapted to receive said hammers.

2. A printer comprising means for generating coded signals characteristic of different characters to be printed; means for receiving input signals representative of characters in one line of type; means for comparing said coded signals with said input signals; means for storing a fraction of said comparisons at one time and for storing the remaining comparisons at another time; a plurality of print hammers equal in number to the total number of characters in one line of type for actuation by said storage means; and a typewheel having type elements arranged in staggered relation and adapted to receive said hammers.

3. A printer comprising means for generating coded signals characteristic of different characters to be printed; means for receiving input signals representative of successive characters in one line of type; means for comparing said coded signals with said input signals; means for storing a maximum of one-half of said comparisons at one time and for storing the remaining comparisons at another time; a plurality of print hammers equal in number to the total number of characters in one line of type for actuation by said storage means; and a typewheel having type elements arranged in staggered relation and adapted to receive said hammers.

4. A printer comprising means for generating coded signals characteristic of different characters to be printed; means for producing input signals representative of successive characters in one line of type; means for comparing said coded signals with said input signals; means for storing one-half of said comparisons at one time and for storing the remaining comparisons at another time; a plurality of print hammers equal in number to the total number of characters in one line of type for actuation by said storage means; and a typewheel having type elements arranged in staggered relation and adapted to receive said hammers.

5. A printer comprising a cylindrical typewheel having type elements in rows which are parallel to the axis of said typewheel, there being two adjacent rows of type for each different character to be printed, said adjacent rows of said typewheel having said type elements staggered so that alternate rows of said typewheel carry alternate columns of said type elements; a plurality of print hammers parallel to the axis of said typewheel, corresponding to the number of columns of type elements, for striking paper to be printed against said typewheel; a code generator for providing a coded signal in timed relation with the angular position of said typewheel, said coded signal being generated at alternate rows of said typewheel, said signal corresponding to a type character to subsequently appear adjacent to said hammers; a pulse generator for producing sprocket pulses in timed relation with the angular position of said typewheel, said sprocket pulse being generated whenever a row of said type elements approach adjacent to said print hammers; means for storing said coded signal during alternate sprocket pulses; means for receiving input signals indicative of successive characters to be printed on one line of said paper; means for successively comparing alternate ones of said input character signals with said stored coded signals; means for storing said comparisons; and means for actuating said print hammers to print the alternate compared characters, said actuating means being energized by the next successive sprocket pulse; said next successive sprocket pulse causing said comparing means to compare the alternate ones of said input character signals, not previously compared, with said stored coded signals and to store said comparisons; the successive sprocket pulse associated with a successive code signal causing said last named stored comparisons to actuate said print hammers to print said last named alternate characters.

6. A printer comprising a cylindrical typewheel having type elements in rows which are parallel to the axis of said typewheel, there being two adjacent rows of type for each different character to be printed, said adjacent rows of said typewheel having said type elements staggered so that alternate rows of said typewheel carry alternate columns of said type elements; a plurality of print hammers parallel to the axis of said typewheel, corresponding to the number of columns of type of elements, for striking paper to be printed against said typewheel; a code generator for providing a coded signal in timed relation with the angular position of said typewheel, said coded signal being generated at alternate rows of said typewheel, said signal corresponding to a type character to subsequently appear adjacent to said hammers; a pulse generator coupled to said typewheel for producing sprocket pulses in timed relation with the angular position of said typewheel, said sprocket pulse being generated whenever a row of said type elements approach adjacent to said print hammers; means for storing said coded signal during alternate sprocket pulses, means for providing input signals indicative of successive characters to be printed on one line of said paper; means for successively comparing alternate ones of said input character signals with said stored coded signals; means for storing said comparisons; and means for actuating said print hammers to print the alternate compared characters, said actuating means being energized by the next successive sprocket pulse; said next successive sprocket pulse causing said comparing means to compare the alternate ones of said input character signals, not previously compared, with said stored coded signals and to store said comparisons; the successive sprocket pulse associated with a successive code signal causing said last named stored comparisons to actuate said print hammers to print said last named alternate characters.

7. In a high speed printer including a cylindrical typewheel having type elements in rows which are parallel to the axis of said typewheel, there being two adjacent rows of type for each different character to be printed, said adjacent rows of said typewheel having said type elements staggered so that alternate rows of said typewheel carry alternate columns of said type elements; and a plurality of print hammers parallel to the axis of said typewheel and in proximity to said typewheel, said plurality of hammers corresponding to the number of columns of type elements, and adapted to strike print paper against said typewheel; the improvement comprising means for receiving a train of input signals indicative of characters in one line of type; a code generator for producing a coded signal in accordance with the next successive character on said typewheel to approach said print hammers; a pulse generator coupled to said typewheel for producing pulses at twice the frequency of said code signals; means for storing successive code signals during successive alternate pulses; means for comparing alternate input signals with a stored coded signal during alternate pulses; means for storing said alternate comparisons; means for actuating alternate ones of said print hammers associated with said alternate comparisons; means responsive to a first set of alternate ones of said pulses to cause a first set of alternate input signals to be compared, a first set of alternate comparisons to be stored, and a first set of alternate print hammers to be energized; and means responsive to a second set of alternate ones of said pulses to cause a second set of alternate input signals to be compared, a second set of alternate comparisons to be stored, and a second set of alternate print hammers to be energized, each of said second sets being different from the corresponding first sets.

8. In a high speed printer including a cylindrical typewheel having type elements in rows which are parallel to the axis of said typewheel, there being two adjacent rows of type for each different character to be printed, said adjacent rows of said typewheel having said type elements staggered so that alternate rows of said typewheel carry alternate columns of said type elements; and a plurality of print hammers parallel to the axis of said typewheel and in proximity to said typewheel, said plurality of hammers corresponding to the number of columns of type elements, and adapted to strike print paper against said typewheel; the improvement comprising means for receiving a train of input signals indicative of successive characters in one line of type; a code generator for producing a coded signal in accordance with the next successive character on said typewheel to approach said print hammers; a pulse generator coupled to said typewheel for producing pulses at twice the frequency of said code signals; means for storing successive code signals during successive alternate pulses; means for comparing alternate input signals with a stored coded signal during alternate pulses; means for storing said alternate comparisons; means for actuating alternate ones of said print hammers associated with said alternate comparisons; means responsive to a first set of alternate ones of said pulses to cause a first set of alternate input signals to be compared, a first set of alternate comparisons to be stored, and a first set of alternate print hammers to be energized; and means responsive to a second set of alternate ones of said pulses to cause a second set of alternate input signals to be compared, a second set of alternate comparisons to be stored, and a second set of alternate print hammers to be energized, each of said second sets being different from the corresponding first sets.

9. In a high speed printer including a cylindrical typewheel having type elements in rows which are parallel to the axis of said typewheel, there being two adjacent rows of type for each different character to be printed, said adjacent rows of said typewheel having said type elements staggered so that alternate rows of said typewheel carry alternate columns of said type elements; and a plurality of print hammers parallel to the axis of said typewheel and in proximity to said typewheel, said plurality of hammers corresponding to the number of columns of type elements, and adapted to strike print paper against said typewheel; the improvement comprising means for providing a train of input signals indicative of successive characters in one line of type; a code generator coupled to said typewheel for producing a coded signal in accordance with the next successive character on said typewheel to approach said print hammers; a pulse generator coupled to said typewheel for producing pulses at twice the frequency of said code signals; means for storing successive code signals during successive alternate pulses; means for comparing alternate input signals with a stored coded signal during alternate pulses; means for storing said alternate comparisons; means for actuating alternate ones of said print hammers associated with said alternate comparisons; means responsive to a first set of alternate ones of said pulses to cause a first set of alternate input signals to be compared, a first set of alternate comparisons to be stored, and a first set of alternate print hammers to be energized; and means responsive to a second set of alternate ones of said pulses to cause a second set of alternate input signals to be compared, a second set of alternate comparisons to be stored, and a second set of alternate print hammers to be energized, each of said second sets being different from the corresponding first sets.

10. In a high speed printer including a cylindrical typewheel having type elements in rows which are parallel to the axis of said typewheel, there being two adjacent rows of type for each different character to be printed, said adjacent rows of said typewheel having said type elements staggered so that alternate rows of said typewheel carry alternate columns of said type elements; and a plurality of print hammers parallel to the axis of said typewheel and in proximity to said typewheel, said plurality of hammers corresponding to the number of columns of type elements, and adapted to strike print paper against said typewheel; the improvement comprising means for providing a train of input signals indicative of successive characters in one line of type; a code generator coupled to said typewheel for producing a coded signal corresponding to the next successive character on said typewheel to approach said print hammers; a pulse generator adapted to provide a first and a second pulse following the production of a coded signal; means for storing successive code signals; means for comparing alternate input signals with a stored coded signal during alternate pulses; means for storing said alternate comparisons; means for actuating alternate ones of said print hammers associated with said alternate print comparisons; means responsive to said first pulses to cause said successive code signals to be stored, to cause a first set of alternate input signals to be compared, to cause a first set of alternate comparisons to be stored, and to cause a first set of alternate print hammers to be actuated; and means responsive to said second pulses to cause a second set of alternate input signals to be compared, to cause a second set of alternate comparisons to be stored, and to cause a second set of alternate print hammers to be actuated; said first sets being different than the corresponding second sets.

11. In a high speed printer including a cylindrical typewheel having type elements in rows which are parallel to the axis of said typewheel, there being two adjacent rows of type for each different character to be printed, said adjacent rows of said typewheel having said type elements staggered so that alternate rows of said typewheel carry alternate columns of said type elements; and a plurality of print hammers parallel to the axis of said typewheel and in proximity to said typewheel, said plurality of hammers corresponding to the number of columns of type elements, and adapted to strike print paper against said typewheel; the improvement comprising means for receiving a train of input signals indicative of successive characters in one line of type; a code generator for producing a coded signal corresponding to the next successive character on said typewheel to approach said print hammers; a pulse generator adapted to provide a first and a second pulse following the production of a coded signal; means for storing successive code signals; means for comparing alternate input signals with a stored coded signal during alternate pulses; means for storing said alternate comparisons; means for actuating alternate ones of said print hammers associated with said alternate print comparisons; means responsive to said first pulses to cause said successive code signals to be stored, to cause a first set of alternate pulses to be compared, to cause a first set of alternate comparisons to be stored, and to cause a first set of alternate print hammers to be energized; and means responsive to said second pulses to cause a second set of alternate pulses to be compared, to cause a second set of alternate comparisons to be stored, and to cause a second set of alternate print hammers to be energized; said first sets being different than the corresponding second sets.

12. In an electronic digital computer system wherein there is included a rotatable magnetic drum for storing, in coded signal form, data to be processed and processed data as well; the combination of a high speed printer mechanism for printing out data stored on said drum, and means for repeatedly reading the data to be printed from said drum during each revolution thereof, said high speed printer mechanism comprising a rotatable typewheel carrying rows and columns of type elements arranged in a staggered checkerboard fashion, each two adjacent rows of type elements carrying like character elements; means for storing code representations of said character elements, one character at a time; means for comparing said data read from said drum with said code representations in said storage means; means for storing comparisons of one alternate series of comparisons at one time and for storing comparisons of a second alternate series of comparisons at another time; and means coupled to said storage means for printing paper by corresponding type elements.

13. In an electronic digital computer system wherein there is included a rotatable magnetic drum for storing, in coded signal form, data to be processed and processed data as well; the combination of a high speed printer mechanism for printing out data stored on said drum, means for reading the data to be printed out at a predetermined location on said drum, and means for repeatedly reading the data to be printed from said drum during each revolution thereof, said high speed printer mechanism comprising a typewheel having type elements in a staggered relationship wherein alternate rows of type elements print alternate columns of print; a plurality of print hammers for actuation against said type elements corresponding in number to the number of columns on said typewheel; a code generator coupled to said typewheel for storing coded representations of characters on said typewheel; means for comparing the said data read out repeatedly with said stored coded representation for two sets of comparisons; means for storing, selectively by signals from said typewheel, one set of comparisons and then the other set; and means for actuating print hammers corresponding to one set of comparisons and then the other.

14. A printer comprising a cylindrical typewheel having type elements in rows which are parallel to the axis of said typewheel, there being two adjacent rows of type for each different character to be printed, said adjacent rows of said typewheel having said type elements staggered so that alternate rows of said typewheel carry alternate columns of said type elements; wherein there appears in sequential order a row of type elements having characters of a first kind in a first alternate relationship, a row of type elements having characters of said first kind in a second alternate relationship, a row of type elements having characters of a second kind in said first alternate relationship, a row of type elements of said second kind in said second relationship, a row of type elements having characters of a third kind in said first alternate relationship, and a row of type elements having characters of said third kind in said second alternate relationship; a row of print hammers corresponding to the number of said columns parallel to said axis for actuation against corresponding characters of the respective columns, alternate ones of said print hammers being adapted to strike type elements in said first alternate relationship and other of said print hammers adapted to strike type elements in said second alternate relationship; a code generator coupled to said typewheel and adapted to generate code representations at a time after said first alternate relationship and before said second alternate relationship of type elements passes by said print hammers; said generator producing a code of said second kind when said type elements of said first kind is in proximity to said chammers, a code of said third kind when said type elements of said second kind is in proximity to said hammers, and a code of a fourth kind when said type elements of said third kind is in proximity to said hammers; means for generating a pulse whenever a row of type elements is in registration with said hammers; a code storage means for storing said code of said second kind during the period from said first character kind second alternate relationship pulse to said second character kind second alternate relationship pulse, for storing said code of said third kind during the period from said second character kind second alternate relationship pulse to said third character kind second alternate relationship pulse, and for storing said code of said fourth kind during the period from said third character kind second alternate relationship pulse to a fourth character kind second alternate relationship pulse; means for providing a train of input signals indicative of successive characters in one line of type, said successive signals corresponding to successive print hammers, wherein said print hammers adapted to strike said first alternate type elements have a relationship to a first set of input signals and said print hammers adapted to strike said second alternate type elements have a relationship to a second set of input signals whereby said first and said second sets of input signals comprise said train of input signals; means for comparing the code stored in said storage means with said first set of input signals during the "odd" period from said second alternate relationship pulse associated with said stored code to the immediately following first alternate relationship pulse, and for comparing the code stored in said storage means with said second set of input signals during the "even" period from said immediately following first alternate relationship pulse to the second alternate relationship pulse immediately following; means for successively storing said comparisons of said first set of input signals during said "odd" period and said comparisons of said second set of input signals during said "even" period; and means for reading out of said comparison sotrage at every second alternate pulse to actuate said hammers corresponding to said second staggered relationship type elements and for reading out of said comparison storage at every second alternate pulse to actuate said hammers corresponding to said first alternate relationship type elements; whereby said second character kind second alternate relationship pulse causes said hammers to print, corresponding to the input signals, all said first kind of characters of said second alternate relation and to store comparisons of said second character kind of said first alternate relationship; and whereby said third character kind first alternate relationship pulse causes said hammers to print, corresponding to the input signals, all said second character kind of said first alternate relationship and to store comparisons of said second character kind of said second alternate relationship.

15. In a high speed printer including a cylindrical typewheel having type elements in rows which are parallel to the axis of said typewheel, there being $n$ adjacent rows of type for each different character to be printed, said adjacent rows of said typewheel having said type elements staggered so that $n$ adjacent rows of said typewheel carry one of said type elements for every column of said typewheel; and a plurality of print hammers parallel to the axis of said typewheel and in proximity to said typewheel, said plurality of hammers corresponding to the number of columns of type elements, and adapted to strike print paper against said typewheel; the improvement comprising means for providing a train of input signals indicative of successive characters in one line of type; a code generator coupled to said typewheel for producing a coded signal corresponding to the next successive character on said typewheel to approach said print hammers; a pulse generator adapted to provide $n$ pulses following the production of a coded signal; means for storing successive code signals; means for comparing every $n$th input signal with a stored coded signal at every $n$th pulse; means for storing said every $n$th comparisons; means for actuating every $n$th ones of said print hammers associated with said every $n$th print comparisons; means responsive to the first of said $n$th pulses to cause said successive code signals to be stored, to cause a first set of every $n$th input signals to be compared, to cause a first set of every $n$th comparisons to be stored, and to cause a first set of every $n$th print hammers to be actuated, and means responsive to the second of said $n$th pulses to cause a second set of every $n$th input signals to be compared, to cause a second set of every $n$th comparisons to be stored, and to cause a second set of every $n$th print hammers to be actuated; said first sets being different than the corresponding second sets; wherein $n$ is an integer greater than one.

16. The improvement claimed in claim 15 wherein $n$ is equal to two.

17. A printer comprising a cylindrical typewheel having type elements in rows which are parallel to the axis of said typewheel, there being $n$ adjacent rows of type for each different character to be printed, said adjacent rows of said typewheel having said type elements staggered so that alternate $n$ rows of said typewheel carry alternate $n$ columns of said type elements wherein there appears in order a row of type elements having characters of a first kind in a first staggered relationship, a row of type elements having characters of said first kind in an *nth* staggered relationship, a row of type elements having characters of a second kind in said first staggered relationship, a row of type elements of said second kind in said *n*th staggered relationship, a row of type elements having characters of a third kind in said first staggered relationship, and a row of type elements having characters of said third kind in said *n*th staggered relationship; a row of print hammers corresponding to the number of said columns parallel to said axis for actuation against corresponding characters of the respective columns, alternate *n*th ones of said print hammers being adapted to strike type elements in said first staggered relationship and other alternate *n*th ones of said print hammers adapted to strike type elements in said *n*th staggered relationship; a code generator coupled to said typewheel and adapted to generate code representation at a time after said first staggered relationship and before said *n*th staggered relationship of type elements passes by said print hammers; said generator producing a code of said second kind when said type elements of said first kind is in proximity to said hammers, a code of said third kind when said type elements of said second kind is in proximity to said hammers, and a code of a fourth kind when said type elements of said third kind is in proximity to said hammers; means for generating a pulse whenever a row of type elements passes by said hammers; a code storage means for storing said code of said second kind during the period from said first character kind *n*th staggered relationship pulse to said second character kind *n*th staggered relationship pulse, for storing said code of said third kind during the period from said second character kind *n*th staggered relationship pulse to said third character kind *n*th staggered relationship pulse, and for storing said code of said fourth kind during the period from said third character kind *n*th staggered relationship pulse to a fourth character kind *n*th staggered relationship pulse; means for providing a train of input signals indicative of successive characters in one line of type, said successive signals corresponding to successive print hammers, wherein said print hammers adapted to strike said first staggered type elements have a relationshtip to a first set of input signals and said print hammers adapted to strike said *n*th staggered type elements have a relationship to an *n*th set of input signals whereby said first and said *n*th sets of input signals comprise said train of input signals; means for comparing the code stored in said storage means with said first set of input signals during a first period from said *n*th staggered relationship pulse associated with said stored code to the immediately following first staggered relationship pulse, and for comparing the code stored in said storage means with said *n*th set of input signals during a second period from said immediately following first staggered relationship pulse to the second staggered relationship pulse immediately following; means for successively storing said comparisons of said first set of input signals during said first period and said comparisons of said *n*th set of input signals during an *n*th period; and means for reading out of said comparison storage at every *n*th staggered pulse to actuate said hammers corresponding to said *n*th staggered relationship type elements and for reading out of said comparison storage at every first staggered pulse to actuate said hammers corresponding to said first staggered relationship type elements; whereby said second character kind second staggered relationship pulse causes said hammers to print, corresponding to the input signals, all said first kind of characters of said *n*th staggered relation and to store comparisons of said second character kind of said first staggered relationship; and whereby the pulse next following said second character kind second staggered relationship pulse causes said hammers to print, corresponding to the input signals, all said second character kind of said first staggered relationship and to store comparisons of said second character kind of said second staggered relationship.

18. The printer as claimed in claim 17, wherein *n* is equal to two.

References Cited in the file of this patent

UNITED STATES PATENTS

| | | |
|---|---|---|
| 2,776,618 | Hartley | Jan. 8, 1957 |
| 2,799,222 | Goldberg et al. | July 16, 1957 |